United States Patent [19]

Eubanks

[11] Patent Number: 4,645,225
[45] Date of Patent: Feb. 24, 1987

[54] WHEELBARROW ENLARGEMENT INSERT

[76] Inventor: Mack W. Eubanks, 832 "K" Ave., Cayce, S.C. 29033

[21] Appl. No.: 816,850

[22] Filed: Jan. 7, 1986

[51] Int. Cl.⁴ .............................................. B62B 1/00
[52] U.S. Cl. ................................... 280/47.31; 298/3; 220/4 F
[58] Field of Search .................... 280/47.31; 298/2, 3; 296/36, 39 R; D34/16; 206/507, 517; 220/4 R, 4 F

[56] References Cited
U.S. PATENT DOCUMENTS

D. 269,335  6/1983  Eubanks ........................... 280/47.31
4,333,678  6/1982  Manoz et al. .................... 296/39 R Primary Examiner—John J. Love
Assistant Examiner—Richard M. Camby
Attorney, Agent, or Firm—B. P. Fishburne, Jr.

[57] ABSTRACT

A molded plastics enlargement insert for a wheelbarrow greatly increases the volumetric capacity thereof so that large quantities of leaves and other lightweight materials can be transported. The insert is formed in multiple sections to greatly facilitate shipment and storage of the product. The user can assemble the sections of the insert using common fasteners and can subsequently disassemble the insert.

1 Claim, 3 Drawing Figures

WHEELBARROW ENLARGEMENT INSERT

BACKGROUND OF THE INVENTION

Prior U.S. Pat. Nos. 1,769,271; 2,805,885 and 3,418,005 show wheelbarrow attachments intended to increase their material carrying capacity. These patented attachments tend to be heavier than desirable and involve a number of coacting parts which render the manufacturing cost of the attachments somewhat more than feasible on the commercial market. Also, the patented devices require the consumer to carry out some assembly operations resulting in some inconvenience. These are the main drawbacks of the noted prior art.

U.S. Pat. No. De. 269,335 issued to Eubanks for a wheelbarrow enlargement insert substantially eliminates the drawbacks of the prior art through provision of a one-piece, lightweight, thin wall, molded plastics insert which is simply placed in the load body of a wheelbarrow to greatly increase its size, and after usage for hauling lightweight materials in large volume, is simply lifted from the wheelbarrow. No complicated assembly steps are required and no tools are required in the use of the insert under the design patent.

However, the device under the design patent has one drawback, namely, its rather large size and unit construction renders it difficult to ship and store.

Accordingly, the object of the present invention is to overcome this one drawback of the device under U.S. Pat. No. De. 269,335, by constructing the device in multiple molded sections which lend themselves to easy packaging for shipment and easy storage during periods of non-use. The insert sections are easily assembled by the consumer in precision interfitting relationship by the use of common releasable fasteners, such as bolts. The assembled insert retains all of the advantages of the device under the noted design patent, without the single disadvantage thereof.

Other features and advantages of the invention will become apparent to those skilled in the art during the course of the following description.

DETAILED DESCRIPTION

Figure 1:
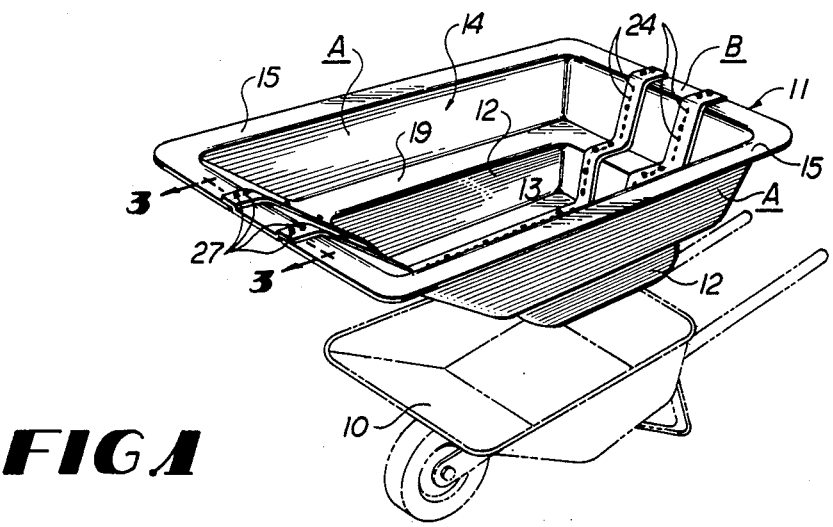
FIG. 1 is an exploded perspective view showing an assembled wheelbarrow enlargement insert and a wheelbarrow for receiving the insert.
Figure 2:
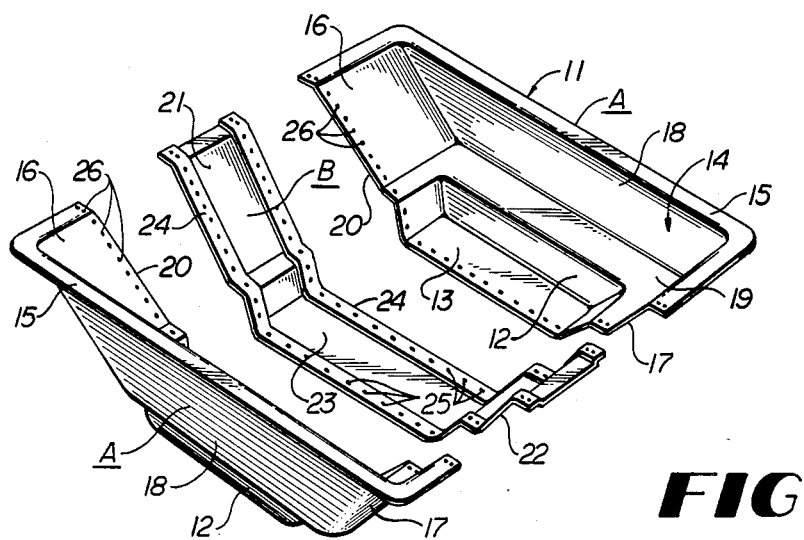
FIG. 2 is an exploded perspective view of a multi-section wheelbarrow enlargement insert according to the invention.
Figure 3:
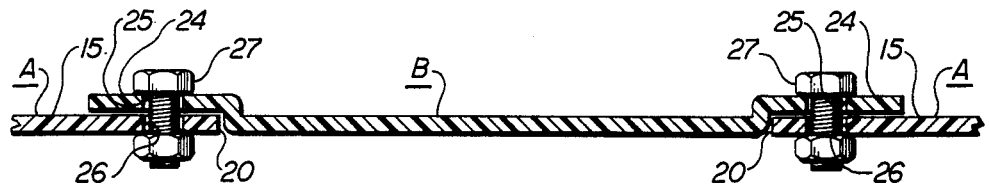
FIG. 3 is an enlarged fragmentary vertical section taken through the bottom wall of the assembled wheelbarrow enlargement insert.

Referring to the drawings in detail wherein like numerals designate like parts, a conventional wheelbarrow 10 has a load body of limited capacity and intended primarily to transport small amounts of heavy material, such as soil, sand and concrete.

An enlargement insert 11 according to the invention for the wheelbarrow 10 greatly increases the size of the wheelbarrow so that large volumes of lightweight material can be transported. The volumetric capacity of the wheelbarrow is increased severalfold by the use of the insert.

The enlargement insert 11 has a central depressed well 12 including a generally flat bottom wall 13 which fits closely in the body portion of the wheelbarrow up to the top edge thereof. Above the top edge of the wheelbarrow, a greatly enlarged extension or portion 14 is provided on the insert 11 and this enlarged portion is disposed above the top of the wheelbarrow body portion and extends both laterally and longitudinally beyond the side walls and end walls thereof during usage.

The insert 11 is preferably formed of molded tough impact and tear-resistant plastics material and may have a very thin wall for the sake of lightness. Such plastics materials are well known in the art and readily available. By forming the insert 11 of such plastics material, the wall thickness of the insert can be as little as 0.100 inch and the total weight of the insert can be as low as 8-9 pounds. A preferred plastics material is polyurethane.

For the purpose of rendering the insert practical for packaging and shipping, as well as storage in a relatively small space, the insert is formed in preferably three sections, namely, two identical side sections A and one central intermediate section B. As shown in the drawings, each side section A includes a portion of the well 12 and a portion of the enlarged extension 14, the latter having a top horizontal flange 15, for the sake of rigidity. Each section A and B has fore and aft sloping walls 16 and 17, a substantially vertical side wall 18, and a flat substantially horizontal ledge 19 projecting outwardly from the top of the well 12. The side sections A of the insert have interior edges 20 which lie in parallel vertical planes.

The mid-section B of the insert is somewhat narrower than the side sections A and includes sloping fore and aft walls 21 and 22 having the same degrees of inclinations as the walls 16 and 17 and a flat bottom wall 23 forming a part of the floor of the well 12.

Along its two parallel longitudinal edges, the mid-section B has slightly raised parallel longitudinal continuous thin flanges 24, each being apertured along its length by multiple spaced apertures 25, similar mating apertures 26 being formed through the two side sections A near and along their edges 20.

The apertured flanges 24 which are raised by only the approximate thickness of the plastics material are adapted to overlap the apertured edge portions of the side sections A, as shown in FIG. 1. The apertures 25 and 26 lie in registration and small removable fasteners, such as bolts 27, are placed through the registering sets of apertures to join the three sections of the insert 11 in assembled relationship. The assembled insert is sturdy and quite rigid and very lightweight in comparison to the known prior art. It is placed as a unit in the wheelbarrow body 10 and is simply lifted therefrom, when desired. The sections A and B are easily taken apart and can be somewhat nested for compact storage or packaging. The knock-down construction of the insert renders it entirely practical and overcomes the described drawbacks in the prior art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A knock-down wheelbarrow enlargement insert having a depressed well which is contoured to fit stably within the body portion of the wheelbarrow and having a substantially enlarged portion above the depressed well adapted to extend substantially outwardly from the margin of a wheelbarrow body portion and well above the latter to materially increase the volumetric capacity of a wheelbarrow, said enlargement insert being constructed in three separate sections to facilitate packaging and storing of the insert, said separable sections including a center section and two side sections, said center and side sections of the insert having straight parallel edges and each insert section being provided with a row of spaced apertures along and near said edges throughout substantially the entire lengths of said edges, the center section of the insert having slightly elevated horizontal flanges along said straight edges of the center section and having the apertures of the center section formed therethrough, said elevated flanges being adapted to rest on said side sections of the insert with the apertures of the center and side sections in registration, and fastener elements removably engageable through the registering apertures of the center and side sections of the insert to secure them in assembled relationship.

* * * * *